Figure 1:
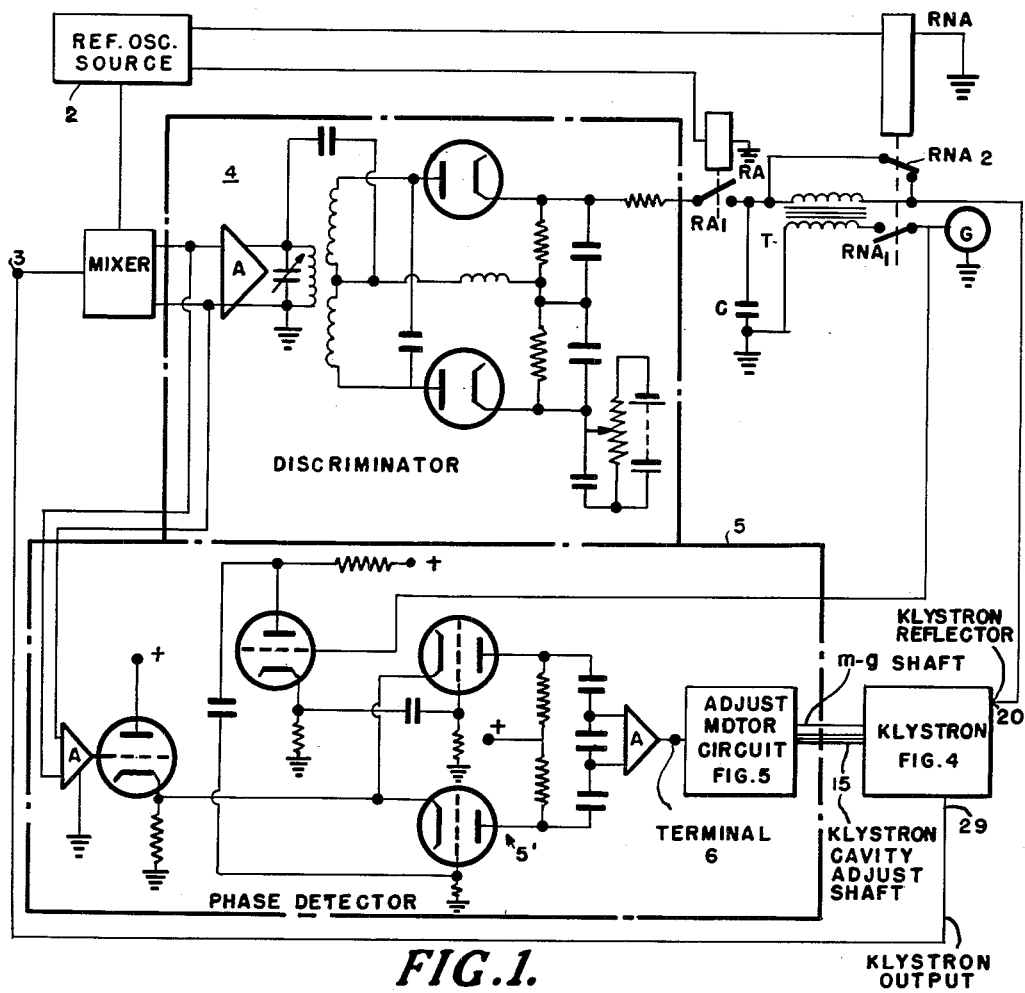

July 10, 1956     S. RATCLIFFE     2,754,420

AUTOMATIC FREQUENCY CONTROL SYSTEM

Filed Oct. 8, 1952     2 Sheets—Sheet 1

INVENTOR
STANLEY RATCLIFFE

BY *Cushman, Darby & Cushman*

ATTORNEYS

July 10, 1956　　　　　　S. RATCLIFFE　　　　　　2,754,420
AUTOMATIC FREQUENCY CONTROL SYSTEM
Filed Oct. 8, 1952　　　　　　　　　　　　　　2 Sheets-Sheet 2

Stanley Ratcliffe　Inventor
By Cushman, Darby & Cushman
Attorneys

United States Patent Office 2,754,420
Patented July 10, 1956

2,754,420
AUTOMATIC FREQUENCY CONTROL SYSTEM

Stanley Ratcliffe, Great Malvern, England, assignor to National Research Development Corporation, London, England, a British corporation Application October 8, 1952, Serial No. 313,751

Claims priority, application Great Britain October 15, 1951

5 Claims. (Cl. 250—36)

This invention relates to automatic frequency control and has particular reference to the automatic control of frequency of oscillators of the reflex klystron type.

Reflex klystron type oscillators may be automatically controlled in frequency in several ways. An example of one type of control which is preferred for many applications is that described and claimed in my British Patent No. 670,238. The output of a conventional discriminator is used to control the reflector voltage of a klystron and, the variation of the mixer output, when the cavity is adjusted, is used to continue or reverse the cavity adjustment automatically accordingly as the cavity adjustment increases or decreases the output of the mixer. This enables automatic optimum adjustment of the cavity within its large frequency range so that there is always a margin of the shorter range reflector voltage adjustment available for correction of quick frequency deviations; it has the additional advantage that optimum power output is obtained at the same time.

Another type of control, an example of which is that described and claimed in my British Patent No. 718,721, is used where a suitable system parameter (e. g. the power output in the case of my British Patent No. 670,238 referred to above) cannot be used for control purposes in addition to the discriminator output. Control of both reflector voltage and cavity adjustment is therefore arranged to be effected by the discriminator output, in whole or in part. It is, however, with the first type of control circuit that the present invention is concerned.

Difficulties arise in such control systems when the reference frequency oscillations with which the oscillator frequency is compared are available for only short periods separated by much longer periods.

For instance, in a control circuit of the type with which the present invention is concerned, when it is required to compare the oscillator frequency with a reference frequency such as that of a transmitter which transmits groups of pulses, say 0.5 μsec. pulses at a P. R. F. of 50 kc./s. for 40 millisecs., and then is silent for longer periods, say 460 millisecs., the error information is not available for a long enough time, i. e. the groups of pulses do not last a long enough time. The reflector-voltage adjustment can, of course, respond in a very short period and a large condenser connected to the reflector will ensure that the corrected reflector voltage remains not only between pulses of a group but between groups of pulses until the next group of pulses again enables correction of the reflector voltage to take place. The slow-moving mechanical cavity adjustment is, however, unable to act effectively during the short time available in a group of such pulses and will not be able to be controlled during the longer periods between groups of pulses. In the example given in my British Patent No. 670,238, it will be appreciated that the variations of output power of the oscillator which can control the cavity adjustment only occur when the reference oscillation is available and, as applied to the present typical case, this would be for only 40 msec. in 500 msec.

It is accordingly an object of the invention to provide an automatic frequency control system, for oscillators of the klystron type in which frequency control is performed by cavity adjustment and reflector voltage adjustment, which is able to operate under conditions when the reference oscillation is available only for short periods separated by much longer periods. In these cases where the reference oscillation consists of a train of pulses, as described in my British Patent No. 670,238 for a radar system for example, it is an object of the invention to provide such a system which can operate when the train of pulses comprises groups of pulses separated by periods long compared with the length of a group.

According to the invention therefore an automatic frequency control system comprises an oscillator of the reflex klystron type, a discriminator adapted to give an output representative of the degree of mistune of the oscillator relative to a reference oscillation, reflector voltage control means adapted to adjust the reflector voltage in response to the output of the discriminator during periods of availability of said reference oscillation, and to oscillate the reflector voltage about the value achieved at the end of each period of availability for succeeding periods when the reference oscillation is not available, and cavity adjustment means arranged to effect cavity adjustment under the control of means able to determine the degree of cavity mistune from variations in the power output of the oscillator resulting from said reflector voltage oscillation and arranged, during the availability of the reference oscillation, to be ineffective to make a significant change in the cavity adjustment having regard to the range of frequency control available from the reflector voltage control.

According to a feature of the invention switching means are provided to connect said reflector voltage control means to said discriminator output only during the availability of said reference oscillation, and said reflector voltage control means comprises a condenser connected to the reflector of said oscillator whereby the reflector voltage is maintained during periods when said reference oscillation is not available.

According to a further feature of the invention a low-frequency voltage source is adapted to be connected to the reflector of the oscillator, during the periods when said reference frequency oscillation is not available, to effect said oscillation of the reflector voltage.

By these arrangements optimisation of the cavity adjustment takes place in the periods when the reference frequency oscillation is not available; moreover, cavity adjustment takes place so slowly if at all when the reference frequency is available that frequency control can be carried out in such periods by the reflector voltage control alone within a practical margin of error.

Figure 2:
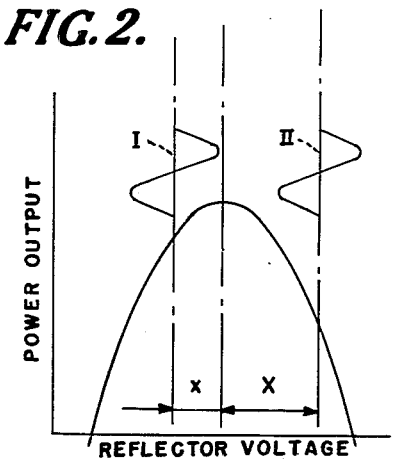
Figure 3:
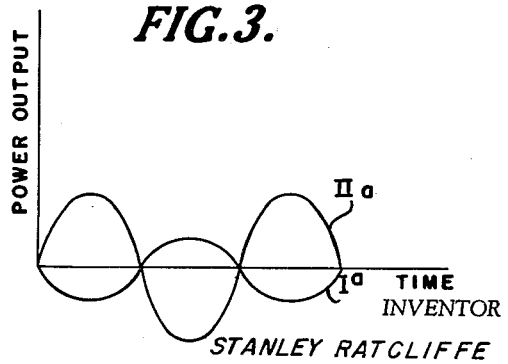
Figure 4:
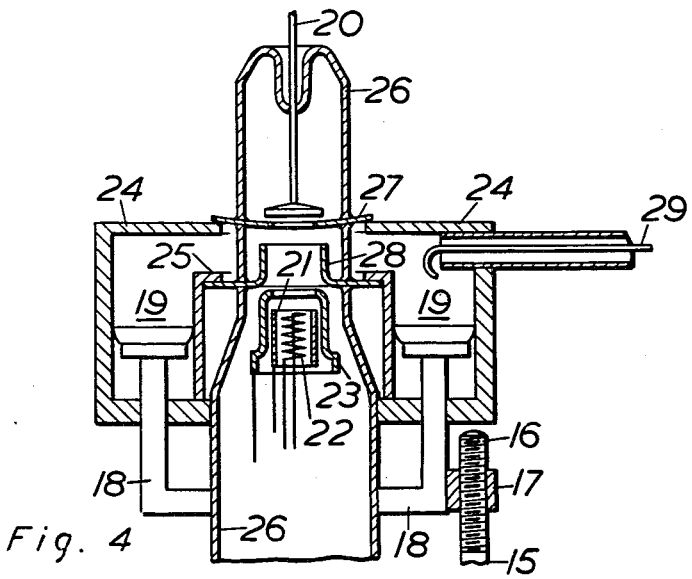
Figure 5:
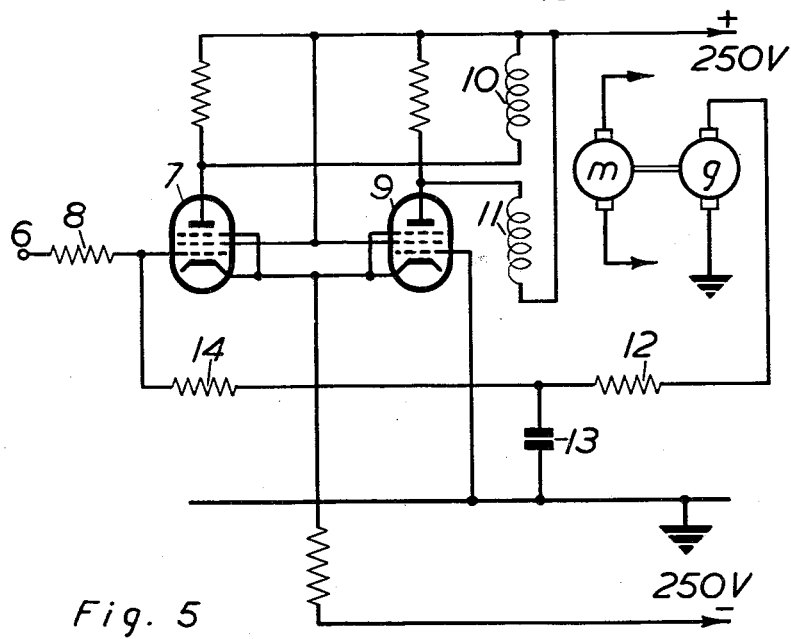
Figure 6:
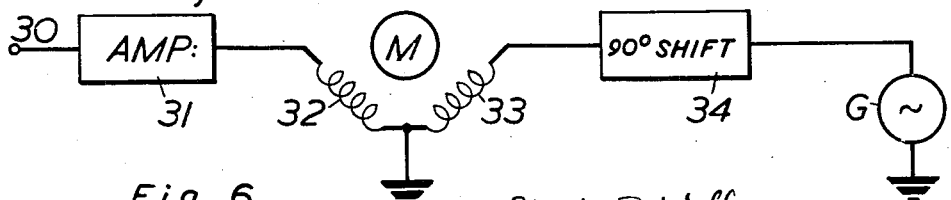

In order to make the invention clear and to show how it may be carried into effect an embodiment thereof will now be described by way of example and reference made to the accompanying drawings in which:

Fig. 1 shows schematically one arrangement of an automatic frequency control system, Figs. 2 and 3 show power output curves relative to the arrangement of Fig. 1, Fig. 4 shows a sectioned view of part of a reflex klystron, Fig. 5 shows a tuning adjustment motor circuit, and Fig. 6 shows another arrangement for a tuning adjustment motor.

In Fig. 1 a mixer 1 is fed from a terminal 2 connected to a source of reference frequency oscillation (not shown) and from a terminal 3 connected to the output of a klystron type oscillator (also not shown) to which it is desired to apply automatic frequency control. The source of reference frequency provides trains of pulses of the reference frequency the pulses lasting 0.5 μsec. and occurring at a pulse recurrence frequency of 50 kc./s. The trains have a duration of 40 millisecs. and are separated by an interval of 460 millisecs. Often the source of reference frequency will be a transmitter associated with a receiver of which the oscillator to be controlled forms part.

The mixer 1 feeds into a discriminator 4; this is of conventional design (as for example, the one shown in the Jaynes' United States Patent 2,541,066, issued February 13, 1951) and gives an output representative of the degree of mistune (i. e. sense and departure) of the oscillator relative to the reference oscillation. That is not to say that the two frequencies are necessarily identical in the absence of mistune but, for example, that the frequency of the oscillator may possess a definite frequency difference from the reference oscillation. In fact, in general, this latter condition will be the case.

The output of the discriminator 4 feeds via a contact RA1 and a contact RNA2 to the reflector of the oscillator. The contact RA1 is arranged to be controlled from a convenient point of the reference oscillation system so that it is made only during the 40 ms. trains of pulses; the contact RNA2 short-circuits the secondary of a transformer T during the trains and will be dealt with in more detail later. Thus, the output of the discriminator 4 is effective to control the reflector voltage, and hence the oscillator frequency during the short trains of pulses. During the much longer intervals however, the reflector is disconnected from the discriminator 4 and so a condenser C is provided and connected to the reflector to maintain the mean corrected reflector voltage until the next train of pulses commences. It will be appreciated that the datum voltage necessary on the reflector for operation of the oscillator is supplied by other and known means which are distinct from the invention and can easily be arranged by those skilled in the art, for example, by a suitable bias in the discriminator output.

Contacts RNA1 and 2, which are arranged to be operated only during the intervals between the pulse trains, operate respectively to connect the earthed primary winding of the transformer T to a source G of low-frequency alternating current and to remove a short-circuit from the secondary winding of transformer T which is connected in the reflector control circuit. Then, during the longer interval between pulse trains, the reflector voltage has superimposed upon it a low-frequency, sinusoidal waveform by virtue of the action of transformer T. This alternation of the reflector waveform will cause the oscillator power output to vary in sympathy. Hence, there will be a variation in output of the mixer 1. The frequency of the alternating current source G may conveniently be of the order of 50–1000 C./S.

The detailed action is illustrated by means of the graphs of Figs. 2 and 3. In Fig. 2 the curve of oscillator power output against reflector voltage is shown and sinusoidal variations of the reflector voltage, superimposed on mean values of the reflector voltage corresponding to different departures from the optimum cavity size for a power output maximum are shown at 1 and II respectively; $x$ represents a departure from optimum cavity size in one sense and X a departure in the other sense. The sinusoidal variations cause sinusoidal variation of the power output of the mixer 1, the phases of the variation being in opposition for different senses of departure. The amplitude of the power output variations at the frequency of the source G corresponds to the magnitude of the departure from the optimum. The power output variations are illustrated in Fig. 3 where curves I$a$ and II$a$ correspond to departures $x$ and X of opposite sense respectively, $x$ being smaller than X.

The output of the mixer 1 is fed to the cavity adjustment means 5. In the cavity adjustment means 5 the undulations of the D. C. component of the output of the mixer 1 are fed to a phase sensitive rectifier 5', the output of which leads to terminal 6. This rectifier can be of known form and will derive its reference voltage from the generator G. For example, the phase sensitive rectifier 5', as illustrated, is like that shown in the United States patent to Spangenberg, No. 2,583,023, issued January 22, 1952, the French counterpart of which, No. 966,593, was published October 13, 1950. The D. C. component of the output of mixer 1 is proportional to the power output of the klystron oscillator and shows the corresponding variations due to the sinusoidal variation of the reflector voltage by the generator G. The output of the phase sensitive rectifier is therefore of polarity corresponding to the phase or antiphase relation between the D. C. component variations and the output of generator G and of a value corresponding to the amplitude of the variations. Thus the output of the phase sensitive rectifier corresponds in polarity to the sense of departure of the cavity adjustment from the optimum point for a power output maximum and in value to the magnitude of the departure of the cavity adjustment from the optimum point.

The output of the phase sensitive rectifier 5' is therefore conveniently fed to the other part of the cavity adjustment means 5, which part is the circuit shown in Fig. 5. This circuit provides the motor $m$ by which the cavity adjustment of the klystron is made in response to the value and polarity of the rectifier output.

The circuit of Fig. 5 is of the type known as a Velodyne circuit. Circuits of the Velodyne type have been described in British patent specification No. 606,673 and have the advantage in use for servo control work that their characteristics, and hence the servo loop characteristics, may be adjusted by means of the feedback generator. Other control circuits are possible however and more simple circuits may be used where this ease of adjustment is not required.

In the circuit of Fig. 5 the output of the phase sensitive rectifier is connected to a terminal 6 which leads to the grid of a valve 7 via a grid resistance 8. The valve 7 and a second valve 9 together form a so-called long-tailed pair in the anode circuits of which the field coils 10 and 11 of the motor $m$ are connected. A generator $g$ mounted on the shaft of motor $m$ is connected by a shaping circuit comprising resistor 12 and condenser 13 and series resistor 14 to the grid of valve 7. According to the polarity of the output on terminal 6 from the phase sensitive rectifier so either valve 7 or valve 9 conducts and a current flows in either field coil 10 or field coil 11. Since these coils are connected in opposition as field coils the motor $m$ will rotate in one direction or the other according to the polarity of the signal on terminal 6. Thus the motor $m$ which controls the cavity adjustment of the klystron oscillator is arranged to rotate in the appropriate direction to adjust the cavity according to the sense of the departure from the optimum power output point.

As stated before the characteristics of the cavity adjustment drive, for example, its inertia, may be determined by suitable design of the generator $g$ feedback circuit 12, 13, 14 in known manner.

The mode of coupling the motor $m$ to the cavity of the klystron is seen from Fig. 4. The shaft 15 of the motor $m$ is threaded at its end 16 and runs in a nut 17 fixed to the plunger system 18 of a reflex klystron tube cavity 19 whereby rotation of the motor shaft 15 changes the tuning of the cavity 19. The klystron valve itself is shown in part and comprises a reflector 20, a cathode 21 with a heater 22 and a gun 23. Walls 24 and 25 of the external cavity 19 are extended to within the glass envelope 26 of the klystron tube cavity 19 by means of copper discs 27 and 28 sealed in the envelope 26. The output of the klystron is taken from the cavity 19 by means of the probe 29. A tube of this type is described in the Bell System Technical Journal, volume XXVI, No. 3, July 1947, as W. E. No. 707–A.

An alternative form of cavity adjustment control may be used as shown in Fig. 6. In this the output of the mixer 1 Fig. 1 is connected to a terminal 30 and via an amplifier 31 to one earthed phase-winding 32 of a two-phase motor M. The motor M is coupled to the klystron cavity plunger system 18 (Fig. 4) as before and its second earthed phase-winding 33 is connected via a 90° phase shift circuit 34 to the alternating current generator G (see also Fig. 1) which supplies the alternating voltage for the reflector circuit of the klystron.

It will be easily seen that when the mixer output is steady (no variation, therefore cavity adjustment at optimum power point) only the one phase winding 33 of the two-phase motor 19 is energised and the motor M will not turn. When, however, the mixer output is varying to show a departure from optimum of the cavity adjustment the phase winding 32 will be energised as well as the winding 33 and the motor M will turn to adjust the klystron cavity according to the phase of the output from amplifier 31 which in turn depends upon the sense of the departure from the optimum. Also as energisation of winding 32 will be greater the greater the departure of the cavity adjustment from optimum the quicker the adjustment can be made.

I claim:

1. An automatic frequency control system comprising, an oscillator of the type adjustable in output oscillation frequency by cavity adjustment and by reflector voltage adjustment, a source of interrupted bursts of reference frequency oscillations, a mixer circuit coupled to the output of the oscillator for mixing the output oscillation with said bursts of reference frequency oscillation, a discriminator coupled to the output of the mixer circuit for generating an output signal while the reference oscillation is available representative of the degree of mixture of the oscillator frequency relative to the frequency of the reference oscillation, reflector voltage control circuit, means for coupling the output of the discriminator to the reflector voltage control circuit, the coupling being effective only while the reference oscillation is available, the reflector voltage control circuit including means adapted for adjusting the reflector voltage according to the output of the discriminator and to oscillate the reflector voltage about the value achieved at the end of each period of availability for succeeding periods when the reference oscillation is not available, and cavity adjustment means coupled to the mixer for effecting cavity adjustment according to the output variations of the mixer resulting from the reflector voltage oscillations, whereby the reflector voltage control circuit operates during the availability of the reference frequency oscillation, and cavity optimisation is obtained during non-availability of the reference frequency oscillation.

2. An automatic frequency control system as in claim 1, wherein said reflector voltage control means includes a condenser connected to the reflector of said oscillator whereby the reflector voltage is maintained during periods when the reference oscillation is not available.

3. An automatic frequency control system as in claim 2 wherein said reflector voltage control means further comprises a low-frequency source, and switching means for connecting the low-frequency source to the reflector of the oscillator during the non-availability of the reference oscillation whereby said maintained reflector voltage is oscillated during the non-availability of the reference oscillation by the low-frequency source.

4. An automatic frequency control system as in claim 3, further including a transformer having a primary and a secondary, said primary being connectable with the low-frequency source and the secondary being connectable in the reflector circuit to transfer low-frequency variations to the reflector of the oscillator, and wherein the switching means is arranged to short-circuit the secondary of the transformer only when the reference oscillation is available and to disconnect the low-frequency source from the transformer primary when the secondary is short-circuited.

5. An automatic frequency control system comprising an oscillator of the type tunable by cavity adjustment and reflector voltage adjustment, a source of interrupted bursts of reference frequency oscillations, a mixer circuit coupled to the oscillator output for mixing the output of the oscillator with said bursts of reference frequency oscillation and arranged to give during the burst periods an output component proportional to the power output of the oscillator, a reflector voltage control circuit, a discriminator coupled to the output of the mixer and connected to feed a correcting voltage to the reflector voltage control circuit, means for providing a mean bias for the reflector voltage, means for maintaining a voltage existing on the reflector when the discriminator output ceases to be effective due to non-availability of the reference frequency oscillation, means coupled to said reference frequency source and responsive to the availability of the reference frequency oscillation for connecting the discriminator output to the reflector circuit of the oscillator only during the periods of availability of the reference frequency oscillation, a source of low-frequency oscillations, a switching means coupled to said reference frequency source and responsive to the absence of the reference frequency oscillation for connecting the low-frequency source to the reflector circuit during the periods of non-availability of the reference frequency oscillation whereby the resulting low-frequency variation of the mean reflector voltage as corrected by the discriminator output during the time the reference frequency oscillation is available causes a low-frequency variation of the mixer output component, and a cavity adjustment circuit connected to the mixer output and responsive to the amplitude and phase of the mixer output variation for tuning the oscillator for optimum power output.

References Cited in the file of this patent

UNITED STATES PATENTS

| | | |
|---|---|---|
| 2,434,293 | Stearns | Jan. 13, 1948 |
| 2,452,575 | Kenny | Nov. 2, 1948 |
| 2,464,818 | Learned | Mar. 22, 1949 |
| 2,475,074 | Bradley | July 5, 1949 |
| 2,562,304 | Durand | July 31, 1951 |
| 2,640,156 | Schultz | May 26, 1953 |

OTHER REFERENCES

Microwave Sweep Generator, Electronics, November 1950, vol. 23, issue No. 11, pages 101–103.